United States Patent [19]
Nakamaru et al.

[11] Patent Number: 5,616,406
[45] Date of Patent: Apr. 1, 1997

[54] SLIDING MEMBER

[75] Inventors: Takashi Nakamaru, Kanagawa-ken; Sumihide Yanase, Ebina; Akihiko Okimura, Yokohama, all of Japan

[73] Assignee: Oiles Corporation, Japan

[21] Appl. No.: 516,775

[22] Filed: Aug. 18, 1995

[30] Foreign Application Priority Data

Aug. 23, 1994 [JP] Japan .................................. 6-221065

[51] Int. Cl.$^6$ .................................. C08J 5/16; C08K 3/30
[52] U.S. Cl. .......................... 442/19; 428/545; 523/149; 524/423
[58] Field of Search ......................... 428/545, 290, 428/256; 523/149; 524/423

[56] References Cited

U.S. PATENT DOCUMENTS

| | | | |
|---|---|---|---|
| 4,624,887 | 11/1986 | Bickle et al. | 428/256 |
| 4,847,135 | 7/1989 | Braus et al. | 428/138 |
| 5,124,397 | 6/1992 | Kanazawa et al. | 524/496 |
| 5,300,366 | 4/1994 | Nakamaru et al. | 428/549 |
| 5,354,622 | 10/1994 | Nakamaru et al. | 428/551 |

FOREIGN PATENT DOCUMENTS

| | | |
|---|---|---|
| 55-23740 | 9/1971 | Japan . |
| 63-57919 | 3/1988 | Japan . |

*Primary Examiner*—Tae Yoon
*Attorney, Agent, or Firm*—Nixon & Vanderhye

[57] ABSTRACT

The disclosure describes sliding member comprising a metal mesh and a resin composition is filled and covered in the mesh and on the surface of the metal mesh, wherein the resin composition comprises 5 to 30% by weight of at least one reinforcing filler selected from the group consisting of glass fibers and wollastonite, 1 to 15% by weight of at least one phosphate selected from the group consisting of calcium pyrophosphate and calcium hydrogen phosphate, 1 to 20% by weight of barium sulfate and the balance of polytetrafluoroethylene, the total content of the reinforcing filler, phosphate and barium sulfate being not more than 60% by weight.

12 Claims, 1 Drawing Sheet

SLIDING MEMBER

BACKGROUND OF THE INVENTION

The present invention relates to a sliding member of excellent friction and wear characteristics.

Since polytetrafluoroethylene (hereinafter simply referred to as "PTFE resin") has excellent self-lubricating properties and low friction coefficient, as well as has chemical resistance and heat resistance, it has been used generally for sliding members such as bearings.

However, since the sliding member composed only of the PTFE resin is poor in the abrasion resistance and creep resistance, such a drawback is compensated, for example, by (1) incorporating a solid lubricant such as graphite and molybdenum disulfide, and/or a reinforcing material such as glass fibers and carbon fibers to the PTFE resin, or (2) filling and covering the PTFE resin in the mesh and on the surface of a metal mesh, depending on the application use of the sliding member.

The sliding member formed by the method (2) has been known, for example, in Japanese Patent Publications No. 55-23740 and No. 53-35107, and Japanese Patent Application Laid-Open (KOKAI) No. 63-57919.

Japanese Patent Publication No. 55-23740 discloses a self-lubricating lining foil comprising a metal wire fabric, a fluoro-plastic and a reinforcing material of inorganic fiber.

Japanese Patent Publication No. 53-35107 discloses a covering sheet as a bearing material, comprising a metal mesh and a fluoro polymer sintered therewith, in which crossing wires portions of the metal mesh are welded at intersections to each other.

In the technique disclosed in Japanese Patent Publications No. 55-23740 and No. 53-35107, a metal mesh is used as a substrate, and a fluoro polymer incorporated with a reinforcing filler is filled and covered in the mesh or on the surface of the metal mesh.

Japanese Patent Application Laid-Open (KOKAI) No. 63-57919 discloses a sliding bearing material comprising a matrix composed of 5 to 25% by volume of lead, 10 to 50% by volume of glass fibers, 40 to 80% by volume of polytetrafluoroethylene and 10 to 50% by volume of zinc sulfide or barium sulfate having a particle size within a range from 0.1 to 1.0 μm, and an expanded metal of 0.3 to 0.9 mm in thickness composed of malleable aluminum alloy having elongation at break of 8 to 20% and Brinnel hardness of 35 to 65, covered therewith, in which rhombic openings of the expanded metal are filled with the matrix and a frictional sliding layer of 0.01 to 0.3 mm in thickness composed of the matrix is present on the expanded metal.

In the technique disclosed in Japanese Patent Application Laid-Open (KOKAI) No. 63-57919, an expanded metal is used as the substrate, and polytetrafluoroethylene incorporated with a reinforcing filler is filled and covered in the mesh and on the surface of the expanded metal.

The sliding members described above exhibit low friction coefficient and satisfactory performance in various different working conditions, for example, under dry condition, oil-immersed condition or oil-lubricated condition, but can not be said to have sufficient durability of the sliding member because the resin layer forming a sliding surface is a thin film.

Further, in a PTFE resin composition for sliding member, as fillers for engineering plastics, particularly, graphite, molybdenum disulfide or other metal sulfides, metal oxides, and inorganic fibers such as glass fibers and carbon fibers may be used.

However, although these fillers contribute to the improvement of the abrasion resistance of the resin layer, the fillers bring about a problem of worsening the low frictional properties inherent to the PTFE resin unless a sufficient care is taken for the blending amount.

As a result of the present inventors' earnest studies, it has been found that by filling and covering a resin composition in the mesh and on the surface of a metal mesh, in which the resin composition is produced by blending a reinforcing filler such as glass fibers, phosphate and barium sulfate and, optionally, solid lubricant at a predetermined ratio to the PTFE resin, the thus obtained sliding member exhibits excellent sliding characteristics and durability.

SUMMARY OF THE INVENTION

An object of the present invention is to provide a sliding member of excellent friction properties, wear characteristics and durability.

To accomplish the aim, in a first aspect of the present invention, there is provided a resin composition for a sliding member, comprising 5 to 30% by weight of at least one reinforcing filler selected from the group consisting of glass fibers and wollastonite, 1 to 15% by weight of at least one phosphate selected from the group consisting of calcium pyrophosphate and calcium hydrogen phosphate, 1 to 20% by weight of barium sulfate, and the balance of polytetrafluoroethylene, the total content of the reinforcing filler, phosphate and barium sulfate being not more than 60% by weight.

In a second aspect of the present invention, there is provided a sliding member comprising a metal mesh and a resin composition filled and covered in the mesh or on surface of the metal mesh, wherein the resin composition comprises 5 to 30% by weight of at least one reinforcing filler selected from the group consisting of glass fibers and wollastonite, 1 to 15% by weight of at least one phosphate selected from the group consisting of calcium pyrophosphate and calcium hydrogen phosphate, 1 to 20% by weight of barium sulfate, and the balance of polytetrafluoroethylene, the total content of the reinforcing filler, phosphate and barium sulfate being not more than 60% by weight.

In a third aspect of the present invention, there is provided a sliding member comprising a metal mesh and a resin composition filled and covered in the mesh or on surface of the metal mesh, wherein the resin composition comprises 5 to 30% by weight of at least one reinforcing filler selected from the group consisting of glass fibers and wollastonite, 1 to 15% by weight of at least one phosphate selected from the group consisting of calcium pyrophosphate and calcium hydrogen phosphate, 1 to 20% by weight of barium sulfate, not more than 10% by weight of at least one solid lubricant selected from the group consisting of graphite and molybdenum disulfide, and the balance of polytetrafluoroethylene, the total amount of the reinforcing filler, phosphate, barium sulfate and solid lubricant is not more than 60% by weight.

DETAILED DESCRIPTION OF THE INVENTION

Figure 1:
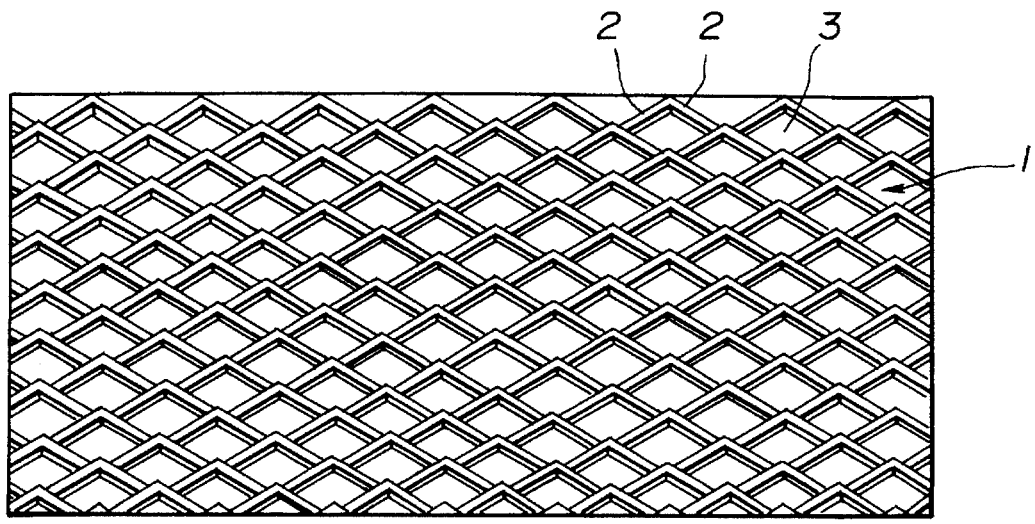
FIG. 1 is an oblique projection view illustrating an example of an expanded metal as a substrate.

The resin composition used for the sliding member according to the present invention is to be explained.

For the PTFE resin as the main ingredient of the resin composition in the present invention, there can be used mainly fine powder, for example, of "Teflon 6CJ", (trade name, produced by Mitsui du Pont Fluoro Chemical Co., Ltd), "Polyflon F201", (trade name, produced by Daikin Industry Co., Ltd), "Fluon CD-076", "Fluon CD-123" and "Fluon CD-4" (trade names, produced by Asahi Glass Co., Ltd).

It is also possible to add a molding powder, for example, "Teflon 7AJ" (trade name, produced by Mitsui du Pont Fluorochemical Co., Ltd.) in an amount of not more than 20% by weight based on the resin composition.

The content of PTFE resin in the resin composition is the balance which is the remainder of subtraction of the amount of filler from the amount of the resin composition. It is preferably 30 to 80% by weight, more preferably 45 to 65% by weight.

For the glass fibers as the reinforcing filler in the resin composition according to the present invention, glass fibers customarily used in this field of the art, that is, glass fibers composed of amorphous silicate glass and borate glass is used. The diameter of the glass fiber is preferably from 5 to 20 µm, particularly suitably from 8 to 12 µm. A preferred length of the glass fiber is from 30 to 100 µm. As a concrete example of such glass fibers, there can be exemplified "MF06JB 1-20" (trade name, manufactured by Asahi Fiber Glass Co., Ltd).

Further, as the reinforcing filler in the resin composition, wollastonite (calcium metasilicate: $CaSiO_3$) can be used in the present invention. As a concrete example, "NYAD-325 or NYAD-G", (trade name, produced by NYCO Co., Ltd, in USA) can be exemplified.

The blending ratio of the glass fibers and/or wollastonite as the reinforcing filler is from 5 to 30% by weight, preferably from 10 to 25% by weight, and more preferably from 15 to 20% by weight. If the blending ratio is less than 5% by weight, no sufficient reinforcing effect can be displayed, and on the contrary, if the ratio exceeds 30% by weight, a drawback of rather deteriorating the abrasion resistance and injuring the mating member occurs.

The phosphate and barium sulfate as the filler for the resin composition according to the present invention is not a material which exhibits lubricating property such as graphite and molybdenum disulfide. However, when the phosphate and barium sulfate are blended with the PTFE resin, the phosphate and barium sulfate exhibit an effect of enhancing the lubricating film-forming property of the PTFE resin to the surface of a mating member (sliding surface), and an effect of forming a lubricating film of the PTFE resin on the surface of the glass fiber and/or wollastonite in the resin composition during sliding movement relative to the mating member, to prevent direct contact between the glass fiber and/or wollastonite and the mating member. In the present invention, the above-mentioned effect can be displayed only when the phosphate and barium sulfate are blended simultaneously with the PTFE resin and the glass fiber and/or wollastonite as the reinforcing filler.

As the phosphate in the present invention, there can be cited a metal salt such as secondary phosphate and pyrophosphate. As a salt-forming metal, alkaline earth metal is preferred. Specifically, calcium hydrogen phosphate ($CaHPO_4(2H_2O)$) and calcium pyrophosphate ($Ca_2P_2O_7$) are more preferred. The average particle size of the phosphate is usually not more than 20 µm, preferably from 1 to 10 µm.

For barium sulfate ($BASO_4$), precipitated barium sulfate and baryte barium sulfate may be used. Such barium sulfate is easily available, for example, from Sakai Chemical Industry Co., Ltd. The average particle size of barium sulfate is usually not more than 10 µm, preferably from 1 to 5 µm.

The blending ratio of the phosphate is from 1 to 15% by weight, preferably 5 to 15% by weight, more preferably 10 to 15% by weight.

The blending ratio of the barium sulfate is from 1 to 20% by weight, preferably 5 to 20% by weight, more preferably 10 to 15% by weight.

A solid lubricant such as graphite (Gr) and molybdenum disulfide ($MoS_2$) can be further blended to the resin composition in addition to the reinforcing filler, phosphate and barium sulfate described above.

The solid lubricant contributes, particularly, to the improvement of the abrasion resistance and the blending ratio of the solid lubricant is not more than 10% by weight, preferably 1 to 8% by weight. If the blending ratio exceeds 10% by weight, it results in deterioration of low frictional property inherent to the PTFE resin as the main ingredient.

Then, the sliding member according to the present invention using as a substrate a metal mesh is to be explained.

As the metal mesh constituting the substrate, there can be used, for example, (1) an expanded metal formed by inserting a thin metal sheet between a stationary lower-die having a linear blade and a movable upper-die having a corrugating, trapezoidal or trigonal blade in a direction perpendicular to the stationary lower-die or in a direction oblique to the blade of the stationary lower-die, reciprocating the movable upper-die vertically, forming slits to the thin metal sheet, and at the same time, expanding the slits to form regular row of mesh, (2) a woven wire mesh formed by weaving fine metal wires as warps and wefts, or (3) a knitted wire mesh formed by knitting fine metal wires.

An expanded metal formed from a thin metal sheet of 0.3 to 2 mm in thickness by expanding fabrication having 0.1 to 1.5 mm of length for each side (strand) and 0.1 to 1.0 mm of thickness is preferred. A woven or knitted wire mesh formed from fine metal wires of 0.1 to 0.5 mm in diameter by weaving or knitting into 1.0–200 mesh is preferred.

As a metal material for forming the expanded metal, woven or knitted wire mesh, thin sheet or fine wire made of stainless steel, copper, phosphor bronze alloy, bronze alloy, aluminum alloy or iron is suitable.

A resin composition endowed with wettability can be obtained by mixing a PTFE resin powder with each of necessary fillers described above and then admixing under stirring a petroleum solvent to the resultant mixture. The PTFE resin and each of the fillers are mixed at a temperature not more than the room-temperature transition point (19° C.) of the PTFE resin, preferably from 10° to 18° C. Further, the resultant mixture and the petroleum solvent are mixed under stirring also at the same temperature as described above. By the use of such a temperature condition, fibrillation of the PTFE resin can be inhibited, thereby obtaining a homogeneous mixture.

As the petroleum solvent, there can be used naphtha, toluene, xylene, an aliphatic solvent or a mixed solvent of an aliphatic solvent and a naphthenic solvent. The amount of the petroleum solvent used is from 15 to 35 parts by weight based on 100 parts by weight of a mixture of the PTFE resin powder and each of the fillers. If the amount of the petroleum solvent used is less than 15 parts by weight, the extensibility of the resin composition endowed with wettability is poor in the filling and covering step to the metal mesh to be described later, and as a result, it tends to cause uneven filling and covering to the metal mesh. On the other hand, if the amount of the petroleum solvent used exceeds 30 parts by weight, it makes the filling and covering operation difficult, as well as deteriorates the uniformity of the covering thickness of the resin composition or worsens the adhesion strength between the resin composition and the metal mesh.

The sliding member according to the present invention is manufactured by way of the following steps (a)–(c).

(a) A resin composition endowed with wettability is spread on a metal mesh comprising an expanded metal, or a woven or knitted wire mesh, rolled down by a roller to fill the mesh of the metal mesh with the resin composition, thereby obtaining a covering layer composed of the resin composition of a uniform thickness on the surface of the metal mesh. In this step, the thickness of the covering layer is from 2 to 2.5 times the covering thickness of the resin composition required for final products.

(b) The metal mesh treated in the step (a) is kept in a drying furnace heated to a temperature from 200° to 250° C. for several minutes to remove the petroleum solvent, and subsequently, the dried resin composition is subjected to pressure roller-treatment at a pressure of 300 to 360 kgf/cm$^2$ so as to obtain a predetermined thickness.

(c) The metal mesh treated in the step (b) is introduced into a heating furnace, and heated at a temperature from 360° to 380° C. for several minutes to ten and several minutes to sinter the resin composition, and subsequently, it is taken out of the furnace and again subjected to pressure roller-treatment to correct variation of size, thereby obtaining a desired sliding member.

In the sliding member obtained by way of the steps (a)–(c), the thickness of the covering layer composed of the resin composition formed on the surface of the metal mesh is usually from 0.05 to 1.0 mm. The thus obtained sliding member is cut into an appropriate size and used as a flat sliding plate or as a cylindrical winding bush by bending circumferentially.

The sliding member according to the present invention exhibits a friction coefficient of 0.06 to 0.163 and abrasion amount of not more than 10 μm in a non-lubrication thrust test at a sliding speed of 3 m/min, under a load (surface pressure) of 150 kgf/cm$^2$, for a test time of 30 hours, and exhibits a friction coefficient of 0.045 to 0.105 and abrasion amount of not more than 20 μm in a non-lubrication thrust test under high load at a sliding speed of 3 m/min, under a load (surface pressure) of 300 kgf/cm$^2$, for a test time of 30 hours.

The sliding member of the present invention exhibits an extremely less abrasion amount and excellent sliding characteristics.

EXAMPLE

The present invention is described in further detail below with reference to the examples thereof, which examples, however, are merely intended to be illustrative and not to be construed as limiting the scope of the invention.

In the following examples, the sliding characteristics of the sliding member were evaluated by the following test methods.

Thrust Test (1):

A friction coefficient and abrasion amount were measured under the conditions described below. Then, the friction coefficient was indicated by a fluctuation value of the friction coefficient during the period from one hour after the start of the test to the completion of the test. Further, the abrasion amount was indicated by the amount of dimensional change for the sliding surface after 30 hours of test time.

| Sliding speed: | 3 m/min |
|---|---|
| Load: | 150 kgf/cm$^2$ |
| Test time: | 30 hrs |
| Lubrication: | non-lubrication |
| Mating member: | carbon steel for mechanical structure (S45C) |

Thrust Test (2):

A friction coefficient and abrasion amount were measured under the conditions described below. Then, the friction coefficient was indicated by a fluctuation value of the a friction coefficient during the period from one hour after the start of the test to the completion of the test. Further, the abrasion amount was indicated by the amount of dimensional change for the sliding surface after 30 hours of test time.

| Sliding speed: | 3 m/min |
|---|---|
| Load: | 300 kgf/cm$^2$ |
| Test time: | 30 hrs |
| Lubrication: | non-lubrication |
| Mating member: | carbon steel for mechanical structure (S45C) |

Examples 1–18 and Comparative Examples 1–3

In the following examples, "Teflon 6CJ" with an average particle size of not more than 80 μm (produced by Mitsui du Pont Fluoro Chemical Co., Ltd) was used as the PTFE resin, and a mixed solvent of an aliphatic solvent and a naphthenic solvent "Exxsol" (trade name, produced by Exxon Chemical Co., Ltd) was used as the petroleum solvent.

At first, the PTFE resin and fillers shown in Table 1 were supplied to a Henschel mixer, and mixed under stirring. 20 parts by weight of the petroleum solvent was blended based on 100 parts by weight of the resultant mixture, mixed at a temperature (15° C.) lower than the room-temperature transition point of the PTFE resin, to obtain a resin composition for filling and covering.

A phosphor bronze alloy sheet of 0.30 mm in thickness was applied with expanding fabrication to form an expanded metal having 0.43 mm in thickness provided with regular square mesh having 0.6 mm of length for each side (strand), which was used as a substrate A.

Fine phosphor bronze alloy wires of 0.30 mm in diameter were used for the wefts and warps to form a woven wire mesh of 50 mesh size, which was used as a substrate B.

The resin composition described above was supplied by scattering on the substrate of the expanded metal and the substrate of the woven wire mesh respectively, rolled down by a roller to fill the meshes of the substrate with the resin composition, thereby obtaining a covering layer of the resin composition on the surface of the substrate. Subsequently, the obtained product was were kept in a hot blow-drying furnace heated to a temperature of 220° C. for 5 min, to remove the solvent in the resin composition.

Then, the substrates filled and covered in the mesh and on the surface with the resin composition were sintered under heating to 360° C. for 10 min in a heating furnace, and thereafter, subjected to pressure roller-treatment to correct the size and amend undulation or the like, thereby obtaining a substrate having a covering layer formed to a thickness of 0.13 mm on the surface. The substrate after completing the amendment was cut to obtain a sliding plate test piece having 30 mm for each side.

Figure 2:
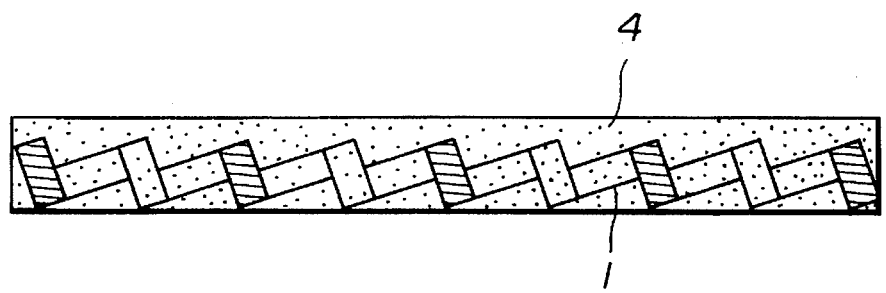
FIG. 2 is a cross sectional view illustrating an example of a sliding member according to the present invention using an expanded metal as the substrate.
Figure 3:
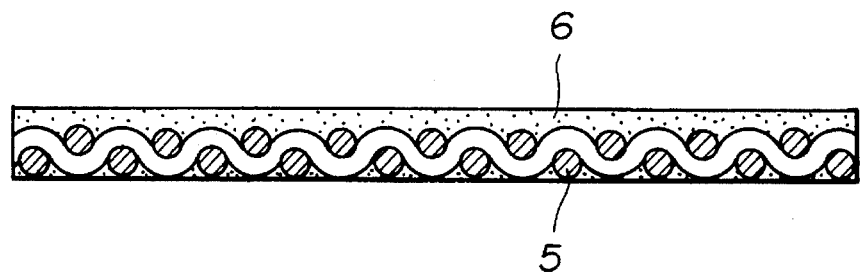
FIG. 3 is a cross sectional view illustrating an example of a sliding member according to the present invention using a woven wire mesh as the substrate.

FIG. 1 is an oblique projection view showing an expanded metal and FIG. 2 is a cross sectional view showing a sliding member using the expanded metal shown in FIG. 1 as a substrate, in which are shown an expanded metal 1, a side (strand) 2, a mesh 3 and a covering layer 4 composed of the resin composition filled and covered in the mesh and on the surface of the expanded metal. FIG. 3 is a cross sectional view showing a sliding member using the woven wire mesh as the substrate, in which are shown a woven wire mesh 5, and a covering layer 6 composed of the resin composition filled and covered in the mesh and on the surface of the woven wire mesh.

Table 1 shows the results of the thrust tests (1) and (2) for each of the sliding members. Further, the blending ratio in the table is indicated by wt %.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| PTFE | 85 | 80 | 75 | 75 | 70 | 70 | 65 | 65 | 55 | 50 | 55 |
| Reinforcing filler (type) | Glass fiber | Glass fiber | Glass fiber | Wollastonite | Wollastonite | Glass fiber | Glass fiber | Glass fiber | Glass fiber | Glass fiber | Glass fiber |
| Reinforcing filler | 5 | 5 | 5 | 5 | 5 | 10 | 10 | 10 | 15 | 15 | 15 |
| Phosphate (type) | Calcium hydrogen-phosphate | Calcium hydrogen-phosphate | Calcium hydrogen-phosphate | Calcium pyrophosphate | Calcium pyrophosphate | Calcium hydrogen-phosphate | Calcium hydrogen-phosphate | Calcium hydrogen-phosphate | Calcium hydrogen-phosphate | Calcium hydrogen-phosphate | Calcium hydrogen-phosphate |
| Phosphate | 5 | 5 | 10 | 10 | 10 | 10 | 10 | 10 | 10 | 10 | 15 |
| Barium sulfate (Type) | Baryte powder | Baryte powder | Baryte powder | Precipitated | Precipitated | Baryte powder | Baryte powder | Baryte powder | Baryte powder | Baryte powder | Baryte powder |
| Barium sulfate | 5 | 5 | 10 | 10 | 10 | 10 | 10 | 10 | 20 | 20 | 15 |
| Solid lubricant (type) | — | MoS$_2$ | — | — | MoS$_2$ | — | MoS$_2$ | Gr | — | MoS$_2$ | — |
| Solid lubricant | — | 5 | — | — | 5 | — | 5 | 5 | — | 5 | — |
| Substrate | A | A | B | A | B | A | A | A | B | A | A |
| Thrust test(1) | | | | | | | | | | | |
| Friction coefficient | 0.085–0.092 | 0.085–0.089 | 0.087–0.091 | 0.087–0.093 | 0.091–0.097 | 0.082–0.095 | 0.081–0.093 | 0.083–0.096 | 0.070–0.081 | 0.065–0.075 | 0.063–0.075 |
| Abrasion amount (μm) | 9.26 | 8.70 | 9.50 | 9.80 | 9.60 | 9.40 | 8.70 | 8.50 | 9.30 | 8.90 | 9.20 |
| Thrust test(2) | | | | | | | | | | | |
| Friction coefficient | 0.083–0.097 | 0.081–0.092 | 0.071–0.082 | 0.073–0.083 | 0.071–0.082 | 0.063–0.076 | 0.061–0.073 | 0.067–0.075 | 0.051–0.067 | 0.045–0.060 | 0.053–0.072 |
| Abrasion amount (μm) | 19.6 | 18.0 | 18.5 | 19.2 | 18.7 | 19.0 | 18.5 | 18.7 | 19.3 | 18.3 | 18.5 |

| | Example 12 | Example 13 | Example 14 | Example 15 | Example 16 | Example 17 | Example 18 | Comp. Example 1 | Comp. Example 2 | Comp. Example 3 |
|---|---|---|---|---|---|---|---|---|---|---|
| PTFE | 50 | 55 | 50 | 50 | 50 | 45 | 40 | 70 | 70 | 50 |
| Reinforcing filler (type) | Glass fiber | Glass fiber | Glass fiber | Wollastonite | Glass fiber | Glass fiber | Glass fiber | Glass fiber | Glass fiber | Glass fiber |
| Reinforcing filler | 15 | 20 | 20 | 25 | 25 | 25 | 30 | 30 | 30 | 30 |
| Phosphate (type) | Calcium hydrogen-phosphate | Calcium hydrogen-phosphate | Calcium pyrophosphate | Calcium pyrophosphate | Calcium pyrophosphate | Calcium hydrogen-phosphate | Calcium hydrogen-phosphate | — | — | — |
| Phosphate | 15 | 10 | 10 | 10 | 10 | 10 | 10 | — | — | — |
| Barium sulfate (Type) | Baryte powder | Baryte powder | Baryte powder | Precipitated | Precipitated | Precipitated | Baryte powder | — | — | Baryte powder |
| Barium sulfate | 15 | 15 | 15 | 15 | 15 | 15 | 20 | — | — | 20 |
| Solid lubricant (Type) | MoS$_2$ | — | MoS$_2$ | — | — | MoS$_2$ | — | — | — | — |

TABLE 1-continued

| | | | | | | | | | |
|---|---|---|---|---|---|---|---|---|---|
| lubricant (type) | | | | | | | | | |
| Solid lubricant | 5 | — | 5 | — | — | 5 | — | — | — |
| Substrate | A | A | A | A | A | A | A | A | B | A |
| Thrust test(1) | | | | | | | | | |
| Friction coefficient | 0.065–0.072 | 0.076–0.145 | 0.080–0.160 | 0.083–0.163 | 0.083–0.137 | 0.080–0.145 | 0.087–0.162 | 0.076–0.093 | 0.070–0.080 | 0.073–0.092 |
| Abrasion amount (μm) | 8.80 | 9.30 | 9.90 | 8.60 | 8.30 | 7.80 | 8.70 | 58.30 | 62.70 | 56.40 |
| Thrust test(2) | | | | | | | | | |
| Friction coefficient | 0.050–0.063 | 0.053–0.070 | 0.045–0.060 | 0.065–0.103 | 0.053–0.070 | 0.060–0.098 | 0.071–0.105 | ** | ** | ** |
| Abrasion amount (μm) | 16.5 | 15.6 | 13.5 | 12.5 | 15.6 | 10.0 | 12.7 | ** | ** | ** |

(Note)
**: The test piece was broken one hour after starting the test and, therefore, the test was discontinued.

From the results of the tests as described above, the sliding members in the examples of the present invention exhibited excellent sliding characteristics both in the Tests (1) and (2), and particularly showed extremely small values for the abrasion amount. On the other hand, the sliding members of comparative examples showed large values for the abrasion amount and were broken within one hour after starting the test under the test conditions (2).

What is claimed is:

1. A sliding member comprising a metal mesh and a resin composition is filled and covered in the mesh and on the surface of the metal mesh, wherein the resin composition comprises 5 to 30% by weight of at least one reinforcing filler selected from the group consisting of glass fibers and wollastonite, 1 to 15% by weight of at least one phosphate selected from the group consisting of calcium pyrophosphate and calcium hydrogen phosphate, 1 to 20% by weight of barium sulfate and the balance of polytetrafluoroethylene, the total content of the reinforcing filler, phosphate and barium sulfate being not more than 60% by weight.

2. A sliding member as defined in claim 1, wherein the resin composition further contains not more than 10% by weight of at least one solid lubricant selected from the group consisting of graphite and molybdenum disulfide, and the total amount of the reinforcing filler, phosphate, barium sulfate and solid lubricant is not more than 60%.

3. A sliding member as defined in claim 1, wherein the metal mesh is selected from the group consisting of expanded metal, woven wire mesh and knitted wire mesh.

4. A sliding member as defined in claim 1, wherein the content of polytetrafluoroethylene is from 30 to 80% by weight.

5. A sliding member as defined in claim 1, wherein the glass fiber has a diameter of 5 to 20 μm and a length of 30 to 100 μm.

6. A sliding member as defined in claim 1, wherein wollastonite is calcium metasilicate.

7. A sliding member as defined in claim 1, wherein the phosphate is calcium hydrogen phosphate or calcium pyrophosphate.

8. A sliding member as defined in claim 1, wherein the phosphate has an average particle size of not more than 20 μm.

9. A sliding member as defined in claim 1, wherein barium sulfate is precipitated barium sulfate or baryte barium sulfate.

10. A sliding member as defined in claim 1, wherein the average particle size of barium sulfate is not more than 10 μm.

11. A sliding member as defined in claim 1, wherein the content of the reinforcing filler is from 10 to 25% by weight, the content of the phosphate is from 5 to 15% by weight, the content of barium sulfate is from 5 to 20% by weight and the content of polytetrafluoroethylene is from 45 to 65% by weight.

12. A sliding member as defined in claim 1, which has a friction coefficient of 0.060 to 0.163 and an abrasion amount of not more than 10 μm in a non-lubrication thrust test at a sliding speed of 3 m/min, under a load (surface pressure) of 150 kgf/cm$^2$ and a test time for 30 hours, and has a friction coefficient of 0.045 to 0.105 and an abrasion amount of not more than 20 μm in a non-lubrication thrust test at a sliding speed of 3 m/min, under a load (surface pressure) of 300 kgf/cm$^2$ and a test time for 30 hours.

* * * * *